United States Patent
Akkihal et al.

(10) Patent No.: US 8,861,664 B2
(45) Date of Patent: Oct. 14, 2014

(54) COMMUNICATION SYSTEM AND METHOD FOR SYNCHRONIZING A PLURALITY OF NETWORK NODES AFTER A NETWORK LOCK CONDITION OCCURS

(75) Inventors: Shivanand I. Akkihal, Austin, TX (US); Rainer Mueller, Austin, TX (US)

(73) Assignee: SMSC Holdings S.a.r.l., Luxembourg (LU)

( * ) Notice: Subject to any disclaimer, the term of this patent is extended or adjusted under 35 U.S.C. 154(b) by 0 days.

(21) Appl. No.: 13/524,323

(22) Filed: Jun. 15, 2012

(65) Prior Publication Data
US 2013/0336435 A1  Dec. 19, 2013

(51) Int. Cl.
*H04L 7/00*  (2006.01)

(52) U.S. Cl.
USPC .......... 375/356; 370/235; 370/252; 370/503; 713/400

(58) Field of Classification Search
USPC ............................ 370/503; 375/356; 713/400
See application file for complete search history.

(56) References Cited

U.S. PATENT DOCUMENTS

| | | | |
|---|---|---|---|
| 6,611,537 B1 | 8/2003 | Edens et al. | |
| 7,016,998 B2 * | 3/2006 | Mukherjee | 710/260 |
| 7,502,546 B2 * | 3/2009 | Elberbaum | 386/201 |
| 7,551,647 B2 | 6/2009 | Fellman et al. | |
| 8,477,616 B1 * | 7/2013 | Rogers et al. | 370/235 |
| 2004/0010727 A1 * | 1/2004 | Fujinami | 713/400 |
| 2005/0175037 A1 | 8/2005 | Porter et al. | |

FOREIGN PATENT DOCUMENTS

| | | | | |
|---|---|---|---|---|
| EP | 1320213 | | 6/2003 | |
| FR | 2949030 | | 2/2011 | |
| FR | 2949030 | A1 * | 2/2011 | ............. H04J 3/06 |

OTHER PUBLICATIONS

International Search Report & Written Opinion, PCT/US2013/041818, mailed Oct. 10, 2013.

* cited by examiner

*Primary Examiner* — Leon-Viet Nguyen
(74) *Attorney, Agent, or Firm* — Kevin L. Daffer; Daffer McDaniel LLP

(57) ABSTRACT

A communication system and method is provided herein for synchronizing a plurality of network nodes after a network lock condition occurs within a network. According to one embodiment, the method may generate a local trigger signal simultaneously at each of the plurality of network nodes by compensating for unique phase delays attributed to each of the plurality of network nodes. As described herein, the local trigger signals may be used for synchronizing devices, such as multimedia devices, which may be coupled to the network nodes. More specifically, the local trigger signals may be used to synchronize events occurring within devices, which are coupled to different nodes of the network.

16 Claims, 9 Drawing Sheets

COMMUNICATION SYSTEM AND METHOD FOR SYNCHRONIZING A PLURALITY OF NETWORK NODES AFTER A NETWORK LOCK CONDITION OCCURS

BACKGROUND OF THE INVENTION

1. Field of the Invention

This invention relates to communication systems and, more particularly, to a communication system and method for synchronizing a plurality of network nodes after a network lock condition occurs.

2. Description of the Related Art

The following descriptions and examples are given as background only.

A communication system is generally well known as containing at least two nodes interconnected by a transmission line. Each transmission line can accommodate not only digital data, but also data that can arrive as voice data, audio data, video data, or bursts of data derived from a computer domain. An optimal transmission line is, therefore, one that can receive information from a multimedia device, herein defined as any hardware and/or software module that can transfer information in whatever form upon the network. The transmission line can either be a copper wire, an optical fiber, or a wireless transmission medium.

There are many types of multimedia devices. For example, a multimedia device can include a telephone, a compact disc (CD) player, a digital video disc (DVD) player, a computer, an amplifier, a speaker, or any device that can send and receive different types of data across the transmission line of the network.

Popular types of data sent or received by multimedia devices include streaming data and packetized data. Streaming data is data that has a temporal relationship between samples produced from a source port onto the network. That relationship must be maintained in order to prevent perceptible errors, such as gaps or altered frequencies at the destination port. Packetized data need not maintain the sample rate or temporal relationship of that data and, instead, can be sent as disjointed bursts across the transmission line.

Streaming data can be sent either synchronously or isochronously across the network depending on the frequency difference between the local clock of the source port (or destination port) and the network frame transfer rate, or the rate at which data frames are transferred across the transmission line. If the local sample rate (sometimes denoted "fs") of the node is the same frequency as the network frame transfer rate (or frame synchronization rate, "FSR") of the transmission line, then the streaming data can be sent synchronously across the network. In many instances, FSR may be dissimilar from the local sample rate, fs, of a multimedia device located within a node. Thus, the local sample rate must be changed (or converted), or the streaming data must be sent isochronously across the network, where isochronous transfer protocols are used to accommodate the frequency differences in order to prevent perceptible gaps, errors, jitter, or echo.

Regardless of how data is being sent across a transmission line, the data must nonetheless be referenced to a clock. The clock (sometimes known as a master clock) placed in one node (sometimes known as a master node) synchronizes the transmission from that node across the transmission line. The remaining nodes of the network (sometimes known as slave nodes) attempt to synchronize their local clocks to the master clock signal, typically by utilizing some form of clock recovery circuit (e.g., a phase locked loop, "PLL", digital signal processor, "DSP," or phase comparator) to lock onto the frequency of the master clock signal. A network lock condition occurs once all nodes of the network have locked on to the master clock signal. The process of locking or synchronizing a local clock signal to a master clock signal is typically performed after power-up, reset or a loss of lock (i.e., an unlock condition) on the network.

Once a network lock condition occurs, the data received by the slave nodes will have the correct frequency but will be phase shifted with respect to the data transmitted by the master node. This phase shift is due to delays attributed to each active node and additional accumulated delays due to tolerances in phase lock within the active nodes. The delays from each active node can vary within some range every time a power-up, reset or unlock to lock event occurs. These delays can also vary between different nodes on the network. Therefore, each node on the network may attribute a different fixed, but unpredictable amount of delay each time a network lock condition occurs. Such unpredictable delays are undesirable in many network applications.

A need exists for a communication system and method for synchronizing a plurality of network nodes after a network lock condition occurs. In particular, a communication system and method is needed to compensate for the unpredictable phase delays, which are produced at the network nodes each time a network lock condition occurs. Such a need is met herein by simultaneously generating a synchronizing trigger signal at one or more nodes of the network.

SUMMARY OF THE INVENTION

The following description of various embodiments of a communication system and method is not to be construed in any way as limiting the subject matter of the appended claims.

According to one embodiment, a method is provided herein for synchronizing a plurality of network nodes after a network lock condition occurs within a network. The method may generate a local trigger signal simultaneously at a plurality of network nodes by compensating for unique phase delays attributed to each of the plurality of network nodes. Once generated, the local trigger signals may be used to synchronize one or more devices coupled to each of the plurality of network nodes, or more specifically, to synchronize events occurring at the devices coupled to the nodes. As described in more detail below, the method described herein may generally include a delay estimation phase, a trigger synchronization phase and an event synchronization phase.

During the delay estimation phase, the method may calculate a unique phase delay at each of the plurality of network nodes. In most cases, the unique phase delay may be calculated once after a network lock condition occurs, e.g., after a power-up, reset or loss of lock in the network. As used herein, a "unique phase delay" may consist of an amount of phase delay needed for a data frame to travel between a receive pin of a network node to a transmit pin of the same network node. Once a unique phase delay is determined for one or more of the network nodes, the method may store an accumulated phase delay within each of the plurality of network nodes. In general, the accumulated phase delay stored within a particular network node may be computed by combining the unique phase delays attributed to all network nodes arranged between a source node of the network and the particular network node. However, methods for computing the accumulated phase delays may vary.

In one embodiment, the accumulated phase delays may be computed by transmitting the unique phase delays calculated at each of the plurality of network nodes to all other network nodes. This enables an individual network node to calculate its own accumulated phase delay by combining the unique phase delays attributed to all network nodes arranged between itself and the source node. In another embodiment, an individual network node may combine its own unique phase delay with an accumulated phase delay received from an upstream network node to generate its own accumulated phase delay. Once generated, the accumulated phase delay may be transmitted to the next downstream node for generation of that node's accumulated delay. Regardless of the method used, the delay estimation phase may end once the accumulated phase delays are stored within each of the network nodes.

During the trigger synchronization phase, the method may measure an offset value between a source trigger signal received by (or generated within) the source node and a predetermined byte of a data frame generated by a master node of the network. After the offset value is determined, the method may transmit the offset value across the network to each of the plurality of network nodes. In some embodiments, the method may add a jitter value calculated at the source node to the offset value and transmit the combined jitter and offset values across the network to each of the plurality of network nodes. In some embodiments, the offset value (or the combined offset and jitter values) may be transmitted within the predetermined byte of the data frame to each of the plurality of network nodes. Although certainly not limited to such, the predetermined byte may be a trigger byte of a MOST data frame, in some embodiments of the invention.

During an event synchronization phase, the method may receive data frames transmitted by the master node at each of the plurality of network nodes. If a particular network node detects the offset value within the predetermined byte of a received data frame, the method as performed by the particular network node may include a number of additional steps. For example, the method may initiate a countdown timer from a predetermined value, and generate a local trigger signal once a count value of the countdown timer is equivalent to the predetermined value minus a combined delay of the offset value (or combined offset and jitter values) and the accumulated phase delay stored within the particular network node. Once generated, the method may synchronize an event at the particular network node to the local trigger signal.

In one embodiment, the method described herein may be used to synchronize events occurring at each of the plurality of network nodes to a common time marker. These events may include, but are certainly not limited to, clock signal generation, input/output signal generation and data sampling. In some cases, the events may occur within one or more multimedia devices coupled to the plurality of network nodes. For example, audio/video signals supplied to a multiple display screen system may be synchronized by the method described herein to coordinate signal reproduction on display screens, which are coupled to different network nodes. Likewise, when left and right speakers of a multiple speaker system are coupled to different network nodes, the audio signals supplied to the left and right speakers may be synchronized by the method described herein to maintain high fidelity. Furthermore, multiple cameras coupled to different network nodes may be synchronized by the method described herein, so that images can be captured by the multiple cameras simultaneously and assimilated into a single image. In other examples, event synchronization may be used to coordinate data sampling across multiple network nodes, or to perform clock synchronization at one or more nodes.

According to another embodiment, a communication system comprising a plurality of network nodes interconnected within a network is provided herein. In general, the communication system may include a source node and a plurality of network nodes, which are coupled to the source node by a network of transmission lines. In one embodiment, the communication system may comprise a MOST network. However, the communication system described herein is not limited to a MOST network and may comprise substantially any synchronous network having substantially any network topology.

In one embodiment, the source node may be configured for calculating an offset value between a source trigger signal received by (or generated within) the source node and a predetermined byte of a data frame received by the source node, and for transmitting the offset value across the network to the plurality of network nodes. For example, the source node may include an offset computation circuit including a counter for calculating the offset value and a buffer for storing the offset value before the offset value is transmitted across the network. In one embodiment, the offset value may be transmitted across the network within the predetermined byte of a data frame.

In one embodiment, the plurality of network nodes may each be configured for receiving data frames transmitted by the source node, detecting the offset value within the predetermined byte of one of the received data frames, and generating local trigger signals for synchronizing devices coupled to the plurality of network nodes. As noted above, the local trigger signals may be generated simultaneously at each of the plurality of network nodes by compensating for unique phase delays attributed to each of the plurality of network nodes.

In some embodiments, the plurality of network nodes and the source node may each include a delay computation circuit for determining and storing a unique phase delay attributed to that node. In one embodiment, the delay computation circuit may comprise a counter, a first storage device and a second storage device. The counter within a particular node may be coupled for determining a unique phase delay attributed to that node immediately following a network lock condition. The first storage device within a particular node may be coupled for storing the unique phase delay attributed to that node. The second storage device within a particular node may be coupled for receiving the unique phase delay from the first storage device, and for storing an accumulated phase delay attributed to that node. As noted above, the accumulated phase delay stored within the second storage device may be calculated in a number of ways. Thus, the second storage device may be additionally coupled for receiving, across the network, either (a) the unique phase delays from all other network nodes, or (b) an accumulated phase delay from the previous upstream node.

In some embodiments, the source node may also include a jitter compensation circuit for measuring and compensating for network jitter. To compensate for network jitter, the jitter compensation circuit may be configured for receiving multiple unique phase delays from the first storage device included within the source node. In particular, the jitter compensation circuit may be configured for receiving a unique phase delay, which was previously computed following a network lock condition, and another unique phase delay measured by the source node upon receiving/generating a source trigger signal. In order to calculate a jitter value, the jitter compensation circuit may determine a difference between the previously and currently measured unique phase delays. After computing the jitter value, the source node may add the jitter value to the offset value before transmitting the combined offset and jitter values across the network within the predetermined byte of a data frame.

In some embodiments, the plurality of network nodes may each include additional components, such as a trigger detect circuit, a countdown timer, a trigger signal generator circuit, and a synchronization circuit. The trigger detect circuit may be generally configured for detecting the offset value (or the combined offset and jitter values) transmitted across the network within the predetermined byte of a data frame. In one embodiment, the trigger detect circuit may comprise logic gates configured for detecting valid data bits within the predetermined byte. In some cases, the valid data bits may correspond to the offset value. In other cases, the valid data bits may correspond to the combined offset and jitter values.

The countdown timer may be generally configured for counting down from a predetermined value once the offset value (or the combined offset and jitter values) is detected by the trigger detect circuit. In some embodiments, the predetermined value may be substantially equal to 2 times a frame size of the data frames transmitted by the source node. However, the predetermined value is not limited to such a value and may alternatively comprise any other value deemed appropriate.

The trigger signal generator circuit may be generally configured for generating a local trigger signal once a count value of the countdown timer is equivalent to computation results supplied, e.g., from an adder/subtractor. For example, an adder/subtractor may be used to subtract a combined delay of the offset value (or the combined offset and jitter values) and the accumulated phase delay stored within the second storage device from the predetermined value to generate computation results. Next, the trigger signal generator circuit may generate a local trigger signal once the count value from the countdown timer is equivalent to the computation results supplied from the adder/subtractor. In one embodiment, the trigger signal generator circuit may include a digital comparator for comparing the count value to the computation results and generating a logic value in response thereto, and a selection device (such as a flip-flop or multiplexer) for generating a local trigger signal in response to the logic value.

The synchronization circuit may be generally configured for synchronizing one or more devices, which may be coupled to each of the network nodes, to the locally generated trigger signals. In one embodiment, the one or more devices may comprise one or more multimedia devices, such as but not limited to, speakers, microphones, cameras, display screens, etc. In some embodiments, the synchronization circuit may be configured for synchronizing events occurring within the one or more devices coupled to the network nodes. Such events may include, but are certainly not limited to, clock signal generation, input/output signal generation and data sampling. In one embodiment, the synchronization circuit may include logic for synchronizing such events upon receiving a locally generated trigger signal.

In some embodiments, the delay computation circuit, the trigger detect circuit, the countdown timer, and the trigger signal generator circuit may each be embodied on a single monolithic substrate comprising a network interface controller (NIC). In some embodiments, the synchronization circuit may also be embodied on the single monolithic substrate comprising the NIC. In other embodiments, the synchronization circuit may be embodied on a separate monolithic substrate included within each multimedia device.

BRIEF DESCRIPTION OF THE DRAWINGS

Other objects and advantages of the invention will become apparent upon reading the following detailed description and upon reference to the accompanying drawings in which.

Figure 1:
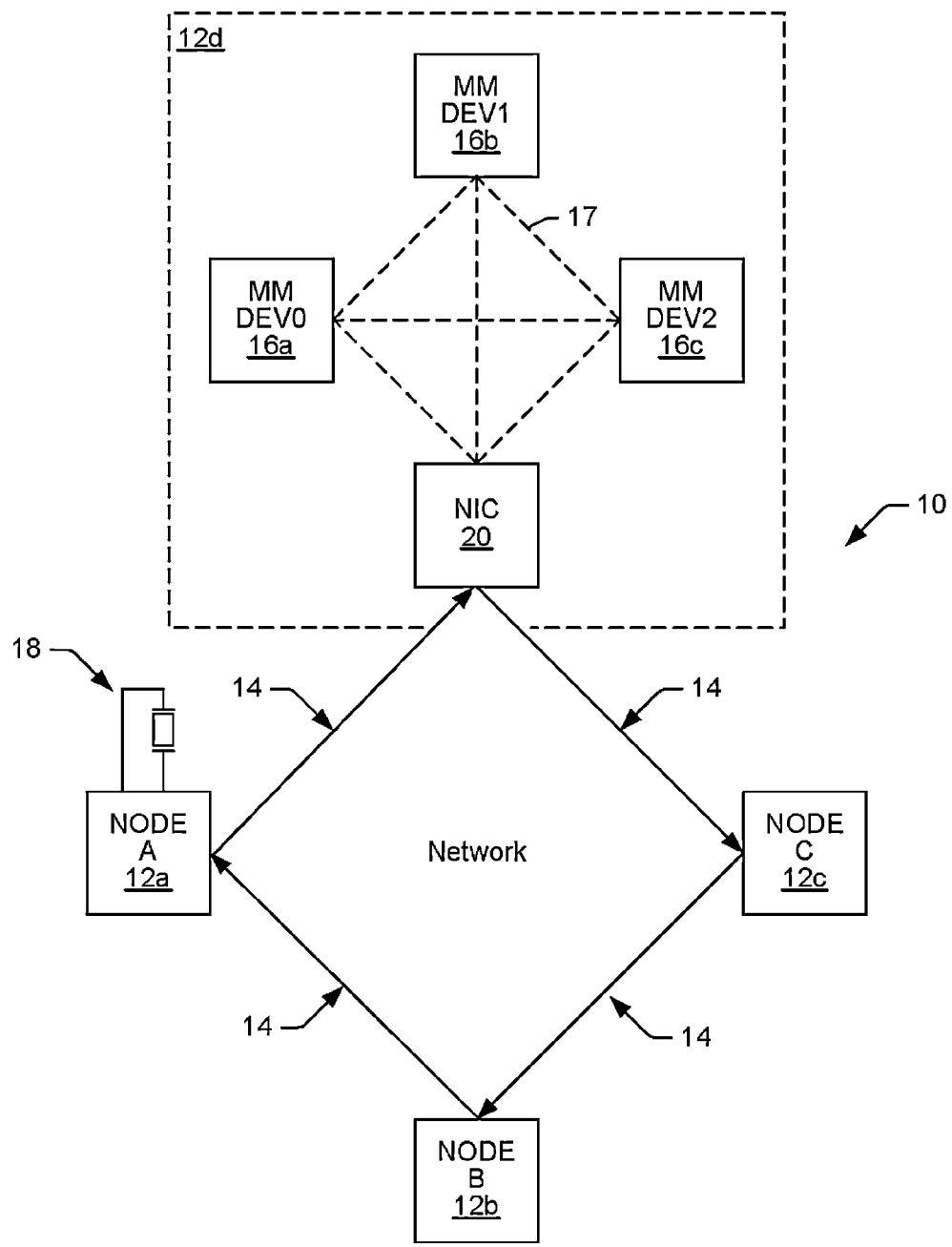
FIG. 1 is a block diagram illustrating one embodiment of a communication system comprising a plurality of nodes interconnected within a network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates one example of a communication system or network 10. Communication system 10 includes a plurality of interconnected network nodes 12. For sake of brevity, only four nodes are shown. However, it is understood that system 10 can include more than four nodes and can also include multiple interconnected networks. The network shown in FIG. 1 is implemented as a ring or loop topology. However, it is also understood that the network backbone can be implemented as a bus, star, or any other topology available to a network. Coupled between nodes 12 are corresponding transmission lines 14. Transmission lines 14 can be optical, acoustic, or electrical (wired or wireless).

Each node 12 is preferably localized to a particular area. Within each node is at least one multimedia device. As shown in node 12d, a node can have more than one multimedia device 16. If more than one localized device 16 is present, then a local transmission line or local bus can be used between multimedia devices 16 in either a loop or bus topology as shown by the alternative phantom lines 17.

Connected between device(s) 16 and the network of nodes 12 is a network interface controller (NIC) 20. If multiple devices 16 are localized to a node 12, the network interface controller 20 is disposed between a local bus 17 and the network transmission lines 14. Interface 20 generally includes a communication port (i.e., bi-directional transmit and receive port) for transmitting communication between the devices 16 arranged in nodes 12. The communication port can also be found within each of the multimedia devices 16 and, depending on its configuration, may include a clock pin, one or two signal pins and at least one data pin or a pair of data pins.

As will be appreciated herein, the network interface function can be placed within one or more of the multimedia devices 16 or the network interface can be separate from the multimedia devices. A multimedia device 16 can be found on a single monolithic substrate and the network interface can also be on a single monolithic substrate. Thus, the communication port can be found on, for example, a monolithic substrate of a network interface controller 20, or on a monolithic substrate of a multimedia device 16 that may or may not contain the network interface controller.

In some embodiments, network interface controller 20 may include a phase locked loop ("PLL"), a digital signal processor ("DSP"), or simply a phase comparator, depending on the method used for sending data across the network. Alternatively, a phase comparator can be included within the network interface controller 20, or outside the network interface controller 20 and simply form a part of a communication node. Additionally, network interface controller 20 could be, for example, within the multimedia device 16 itself.

Multimedia device 16, one or more of which are found within a node, is any device that can send and/or receive multimedia signals. Such signals include voice, audio, video, data files, or executable data programs. Examples of such devices include telephones, sensors, CD players, DVD players, video cameras, speakers, monitors, computers, personal digital assistants (PDAs), frequency modulated stereos, navigational systems, etc. In some cases, one or more of the multimedia devices 16 may sample data at the frame transfer rate (FSR) of transmission line 14. For example, multimedia device 16 may be a DVD player that samples at approximately 48 KHz. It is recognized, however, that one or more multimedia devices 16 can sample data at a higher or lower sampling rate (fs) than the frame transfer rate (FSR) of transmission line 14. For example, multimedia device 16 may be a CD player that samples data at approximately 44.1 KHz.

According to one example, the multimedia devices 16 can be located within an automobile, and the communication system 10 can be employed within the automobile for linking the multimedia devices to one another or to multimedia devices within other nodes of the same automobile, or to another automobile, a satellite, or a stationary base station. Depending on whether data is encrypted or encoded at the multimedia device 16, communication system 10 may allow transfer of such information to the destination as either streaming data (synchronous or isochronous), asynchronous data (packetized) or control data. In addition, communication system 10 can allow transfer of all four types of data across one or more channels established within transmission line 14 or across local bus 17. Communication system 10, therefore, accommodates the different types of data in order to add versatility to the various types of multimedia devices 16 which can be used. Regardless of how data is being sent across a transmission line 14, the data must nonetheless be referenced to a clock.

In a preferred embodiment, the communication system 10 shown in FIG. 1 is implemented as a synchronous network of interconnected nodes. In a synchronous network, one node (e.g., node 12a) of the communication system 10 is designated as a master node and has a local master clock, which can be derived from an internal or external crystal oscillator 18, for example. The data transferred from node 12a is synchronized to the master clocking signal before it is transmitted onto the transmission line 14 at the frame transfer rate ("FSR"). Various methods may be used for synchronizing the data received by the slave nodes 12b-d to the transmitted data stream.

In some embodiments, a clock recovery circuit may be included within each of the various slave nodes 12b-d in order to recover the master clocking signal and synchronize the received data to the transmitted data stream. In one example, the clock recovery circuit within the slave nodes may include a PLL (not shown) for generating a recovered clock (i.e., a local sampling clock locked to the master clock) that may be used to synchronize a digital subsystem, such as a multimedia device 16. The clock recovery circuit and, more particularly, the PLL within each of the slave nodes may generate a local sampling clock by simply reconstructing the master clock, or alternatively, by converting the master clock rate into a desired sampling rate. The clock recovery circuit may be included within the network interface controller 20 or the multimedia devices 16 of the slave nodes 12b-12d. It is noted, however, that a clock recovery circuit such as the one described above may not be included within the slave nodes in all embodiments.

In other embodiments, a frame synchronization method may be used within the slave nodes 12b-12d to synchronize a local clock to the master clock frequency transmitted across the network. For example, the slave nodes may receive data frames transmitted synchronously across the network at a frame transfer rate ("FSR"), which is substantially equivalent to the master clock frequency. Each data frame may include a number of administrative bytes (including, e.g., a preamble and one or more flags, descriptors and/or control data bytes) followed by a number of data bytes. The data frames may be generated by the master node and the transmitted bit stream may be synchronized to a timing source (e.g., crystal oscillator 18), which is internal or external to the master node. In some cases, the slave nodes may utilize the preamble of a received data frame for purposes of clock regeneration and data synchronization.

The Media Oriented Systems Transport (MOST) network is one example of a synchronous network that uses the preamble of received data frames for purposes of clock regeneration and data synchronization. The MOST network is a high-speed multimedia network technology, which uses synchronous data communication to transport audio, video, voice and data signals via plastic optical fiber or electrical conductor physical layers. A MOST network may consist of up to 64 nodes arranged in a ring configuration, although other network topologies may be used. One of the nodes is designated as the timing master and functions to supply the ring with MOST frames. The MOST frames can be transmitted across the network at frame transfer rates of 44.1 kHz or 48 kHz. Each frame consists of three parts: a synchronous channel for streaming data, an asynchronous channel for packetized data, and a control channel for control and low speed data.

There are currently three types of MOST networks. The first type, referred to as MOST25, uses a frame length of 512 bits and provides a bandwidth of approximately 25 Mbits/s for streaming (synchronous) as well as package (asynchronous) data transfer over an optical physical layer. A MOST25 frame typically includes a preamble, a boundary descriptor, a synchronous data area, an asynchronous data area, and a control channel area, in addition to frame control and parity bits. The boundary descriptor specifies the boundary between the synchronous and asynchronous data areas in the data frame.

A MOST50 system doubles the bandwidth of the MOST25 system (to approximately 50 Mbits/s) and increases the frame length to 1024 bits. MOST150 further increases the frame length up to 3072 bits, which is about six times the bandwidth of the MOST25 system. It also integrates an Ethernet channel with adjustable bandwidth in addition to the three established channels provided in the other MOST systems. While the three established channels (synchronous channel, asynchronous channel and control channel) remain the same, the length of the control channel and the boundary between the synchronous and asynchronous channels are flexible in the MOST50 and MOST150 frames.

The MOST frame structure is designed to allow for easy re-synchronization, as well as clock and data recovery, by utilizing the preamble of the data frame to designate a network lock condition. For example, the first reception of a set of valid preambles at the correct times after a reset, power-up or loss of lock occurs may indicate to the slave nodes that a network lock condition has occurred. Once the network is locked, the slave nodes may extract and use data from the encoded data stream.

Once network lock is achieved, the local clocks within the slave nodes will be locked to the frequency of the master clock signal. However, the data received by the slave nodes will be phase shifted with respect to the data transmitted by the master node. This phase shift is due to delays attributed to each active node and additional accumulated delays due to tolerances in phase lock within the nodes. Although the fixed timing relationship between the nodes of a synchronous network results in a fixed amount of phase delay for each active node, the amount of delay is unpredictable and can vary between different nodes on the network. In addition, the amount of delay can vary within some range every time a power-up, reset or unlock-to-lock event occurs. Thus, each node on the network may contribute a different fixed, but unpredictable amount of phase delay each time a network lock condition occurs. Such phase delay is undesirable in many network applications.

Let us consider the case in which multimedia devices 16 are coupled to the network nodes, as shown in the exemplary network of FIG. 1. As discussed above, these multimedia devices may include speakers, microphones, DVD players, CD players, cameras, or any other of the vast multimedia devices known in the art. In many multimedia applications, it is often important, if not imperative, to synchronize certain events that occur within the multimedia devices attached to different network nodes. These events may include, but are certainly not limited to, clock signal generation, input/output signal generation and data sampling.

For example, it may be desirable to synchronize the local clocks of one or more multimedia devices 16 coupled to one or more of the network nodes 12a-12d. Clock synchronization may be desired, for example, to synchronize the edges of low frequency local clocks used by the multimedia devices 16. However, event synchronization is not limited to clock synchronization, and may be applied generally to the synchronization of input signals supplied to the multimedia devices and/or output signals generated by the multimedia devices. Although several example applications are provided below, one skilled in the art would recognize other applications in which event synchronization may be useful and/or desired.

First, consider the case in which left and right speakers of a multiple speaker system are coupled to different nodes of the network. In this case, it is important to synchronize the audio signals supplied to the left and right speakers of the multiple speaker system to maintain high fidelity. A similar situation arises when audio and video (A/V) signals are supplied to a multiple display system in which the display screens of the multiple display system are coupled to different network nodes. In this case, it is important to synchronize the A/V signals supplied to the different network nodes to coordinate the reproduction of such signals across the multiple display screens. In yet another example, multiple cameras coupled to different network nodes may need to be synchronized, so that images can be captured by the multiple cameras simultaneously and assimilated into a single image. This may be particularly useful in driver assist applications, which may combine the simultaneously captured images into a 3D view, for example. Finally, event synchronization may be used to coordinate data sampling across multiple network nodes, as may occur for example in distributed microphone arrays. If individual microphone arrays are coupled to different network nodes, the data sampled at each of the distributed arrays may be synchronized for purposes of noise or echo cancellation.

A need exists for a communication system and method for synchronizing the nodes of a synchronous network after a network lock condition occurs. In particular, a communication system and method is needed to compensate for the different fixed but unpredictable amounts of phase delay, which are produced at the network nodes each time a network lock condition occurs. As set forth below, such need is met herein by simultaneously generating a local trigger signal at one or more nodes of the synchronous network. While described below in the context of a MOST network, the inventive concepts set forth herein may be applied to substantially any synchronous network having substantially any network topology.

Figure 2:
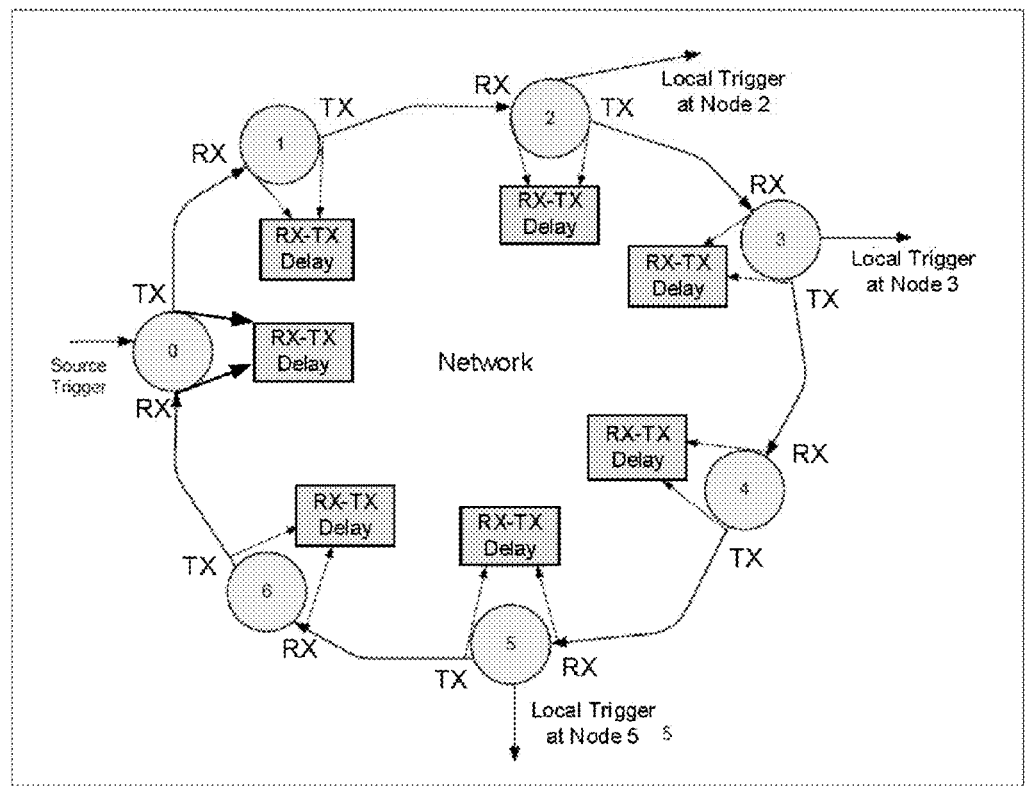
FIG. 2 is a block diagram illustrating the arrival of a source trigger signal at a source node of a network and the generation of a local trigger signal at a plurality of network nodes, wherein the local trigger signals are generated simultaneously at each of the network nodes by compensating for unique phase delays (e.g., RX-TX delays) attributed to each of the nodes.

Returning to the drawings, the communication system 10 shown in FIG. 1 is preferably implemented as a synchronous network, and in one specific embodiment, may be implemented as a MOST network. As noted above, all nodes of a synchronous network have a fixed timing relationship with the network timing master node, which results in each node having a fixed timing relationship with all other nodes on the network. In addition, and as shown in FIG. 2, each node of the network may contribute a fixed amount of phase delay (referred to herein as an RX-TX delay) between a fixed point of a data frame received on a receive ("RX") side of the node and the same fixed point of the data frame transmitted on the transmit ("TX") side of the node. While this delay is fixed, due to the fixed timing relationship between nodes on a synchronous network, the RX-TX delay is unpredictable over power, reset and unlock/lock conditions, and may be different for different nodes on the network. For example, the RX-TX delay in the slave nodes may be much smaller than that in the timing master node. In addition, the RX-TX delay may differ between slave nodes of the network.

In order to compensate for this delay, a synchronizing trigger signal may be generated or received by a source node (e.g., node 0, FIG. 2) of the network, transmitted across the MOST network and used by one or more destination nodes (e.g., any of nodes 1-6, FIG. 2) of the network to synchronize events that occur at the destination nodes. As used herein, a "source node" is the network node that either generates or receives a source trigger signal. The "source node" may be a "master node," in some embodiments, or a "slave node" in other embodiments. The "destination nodes" are network nodes, which are coupled to the source node for receiving data frames from the source node and for using information contained within the data frames for recreating the source trigger signal as a local trigger signal.

In one embodiment, the local trigger signals may be used to synchronize the local clocks of the destination nodes, in both frequency and phase, to the master clock signal or frame transfer rate transmitted across the network. In other embodiments, the local trigger signals may be used to synchronize input signals supplied to the destination nodes (or multimedia devices coupled to the nodes) or output signals generated by the destination nodes (or multimedia devices coupled to the nodes). In some cases, the local trigger signals may be used for synchronizing events occurring within substantially all network nodes. In other cases, the local trigger signals may only be used for synchronizing events occurring within a subset of the destination nodes (e.g., nodes 2, 3 and 5), as shown in the exemplary embodiment of FIG. 2.

There are numerous methods by which a trigger signal may be generated and transmitted across the MOST network. In some cases, such methods may be implemented within the network interface controller (NIC) 20. It is noted however, that the methods described herein are not limited to the NIC 20 and may implemented, in other embodiments of the invention, within one or more chips or circuits coupled to the NIC 20. In these embodiments, the NIC 20 may pass all information required for event synchronization onto the additional chips/circuits.

As of this writing, there is currently no dedicated logic (hardware or software) within the MOST NIC 20 for generating a synchronizing trigger signal at various nodes of the synchronous network 10. However, existing logic on many of the currently available MOST NIC integrated circuits (ICs) can be used and/or modified to generate a synchronizing trigger signal locally at the network nodes. While such methods can be implemented without making hardware changes to the MOST NIC IC, the synchronizing trigger signals generated by such methods generally have limited accuracy, and thus, may not be desirable in all cases.

In one exemplary method, a MOST synchronous channel may be used to transmit a synchronizing trigger signal across the MOST network to the one or more destination nodes. In this method, an external trigger signal may be fed into the source node as a streaming port data input, which is then transmitted across the MOST network over the synchronous channel to the destination nodes. Once received by the destination nodes (e.g., at the streaming port SX pin of the destination nodes), the destination nodes may use the steaming data to reproduce the trigger signal for purposes of event synchronization. Although this method can be implemented on existing MOST NICs 20 through simple firmware modification, the synchronous channel method provides several disadvantages. For example, it consumes one synchronous channel bandwidth on the MOST network, as well as one streaming port at the source node and each of the destination nodes. In addition, the synchronous channel method suffers from increased latency, and provides latency numbers which are unpredictable. This results in trigger signals with very limited accuracy.

In another exemplary method, a phase-locked loop ("PLL") within the MOST NIC 20 may be used to generate a synchronizing trigger signal. At the source node, an internally or externally generated trigger signal (i.e., a source trigger signal) may be monitored by a PLL and the trigger information may be transmitted over the MOST network. Once received, the trigger information may be used by a PLL included within the destination nodes to recreate a version of the source trigger signal (at the same frequency, multiple frequency or sub-multiple frequency of the source trigger), which can be used to synchronize events at the destination nodes.

Like the previous method, the frequency synthesizing PLL method described above can be implemented within many of the existing MOST NIC ICs (those with PLL hardware). However, the frequency synthesizing PLL method described above is only useful for periodic trigger signals and consumes one isochronous phase channel bandwidth on the MOST network. In addition, the method requires one frequency synthesizing PLL at each destination node, which could otherwise be used for audio or video clock recreation. Furthermore, the method generates an unpredictable amount of delay between the source trigger signal and the trigger signal reproduced at the destination nodes, and suffers from timing differences between the local trigger signals generated at different destination nodes. Thus, like the synchronous channel method described above, the frequency synthesizing PLL method fails to generate trigger signals with acceptable accuracy.

Although acceptable for some applications, the methods described above provide an unpredictable amount of delay between the trigger signals generated at the destination nodes. This unpredictable amount of delay reduces the timing accuracy of the generated trigger signals and, in most cases, prevents the trigger signals from being generated simultaneously at each of the destination nodes. In addition, either a streaming port or a PLL block in the source node and each of the destination nodes is required to implement the above-mentioned methods. In order to overcome these disadvantages, an improved communication system and method for synchronizing a plurality of network nodes is provided herein and discussed in detail below.

Figure 3A:
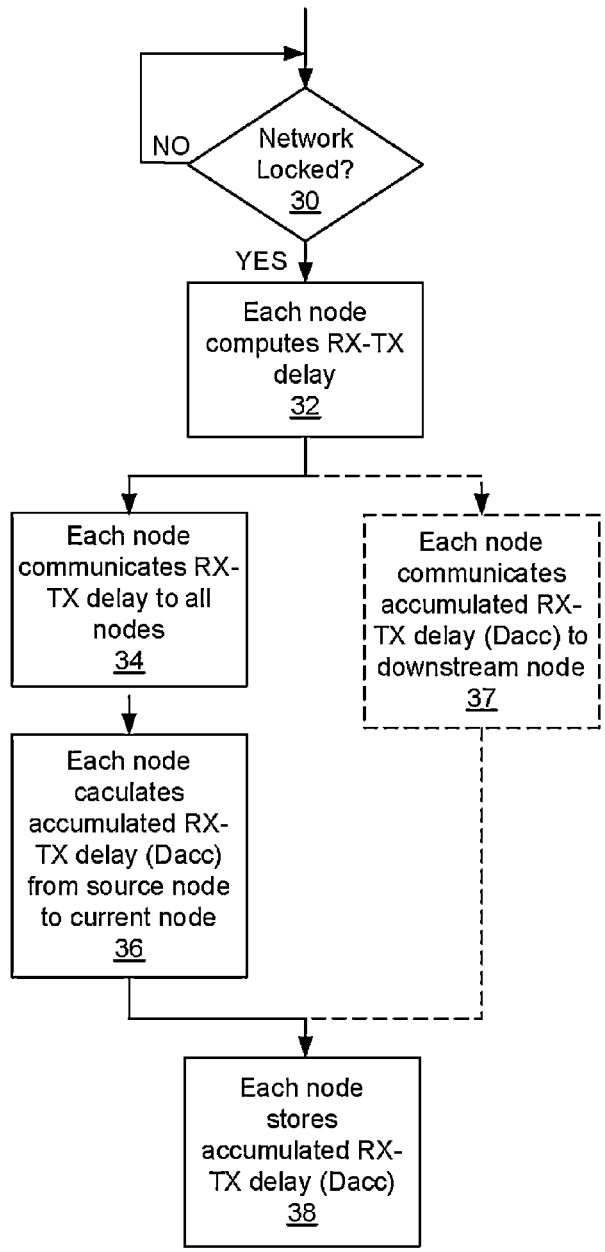
FIG. 3A is a flow chart diagram illustrating one embodiment of a method that may be used to estimate the unique phase delays attributed to each network node.
Figure 3B:
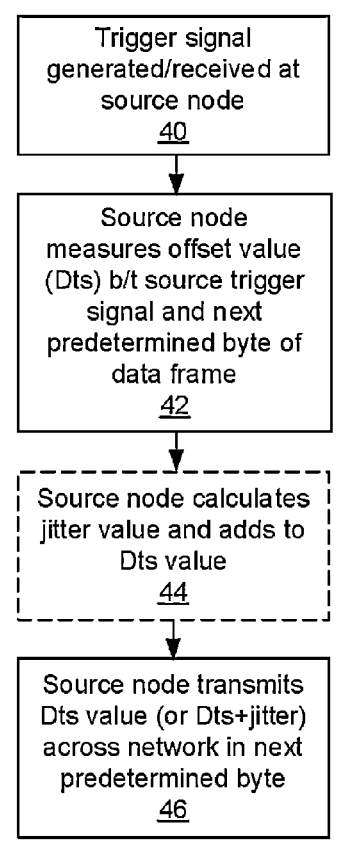
FIG. 3B is a flow chart diagram illustrating one embodiment of a method that may be used to measure an offset value between the source trigger signal and a predetermined byte of a data frame received by the source node, and to transmit the offset value across the network, e.g., within the predetermined byte of the data frame.
Figure 4:
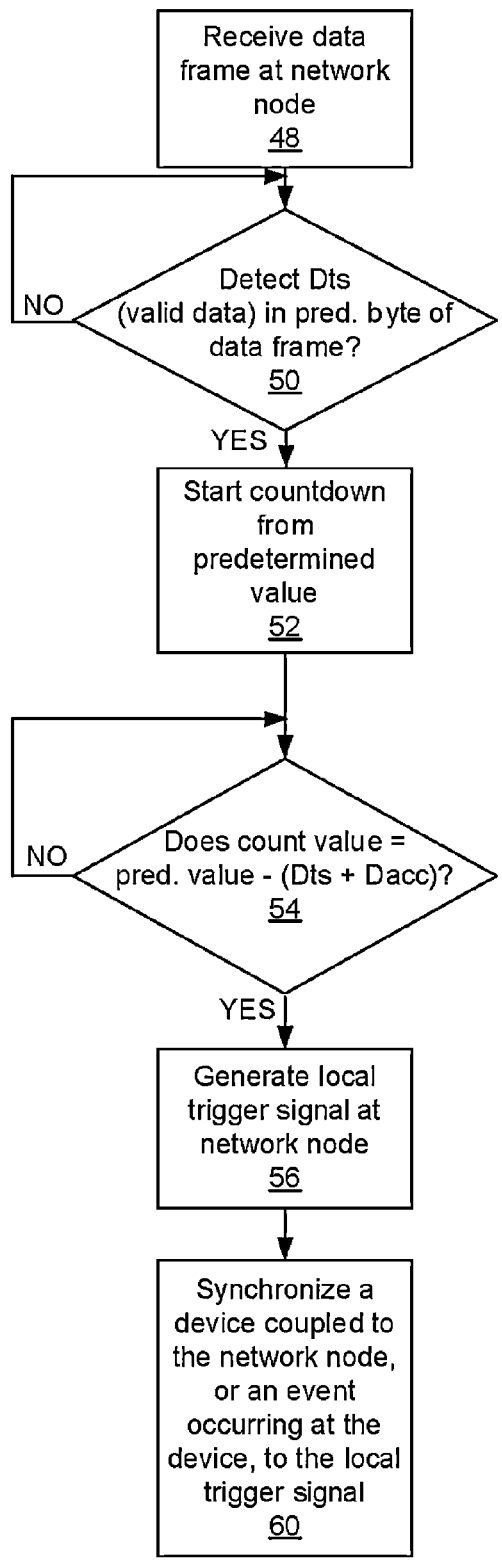
FIG. 4 is a flow chart diagram illustrating one embodiment of a method that may be used to detect the offset value within the predetermined byte of a received data frame, and to generate a trigger signal at one or more of the network nodes for synchronizing events occurring at the network nodes and/or devices coupled to the network nodes.

One embodiment of an improved method for synchronizing a plurality of network nodes is shown in FIGS. 3-4. FIG. 3A illustrates a delay estimation phase of the improved method, whereby unique phase delays attributed to each of the network nodes are calculated and an accumulated phase delay is stored therein. FIG. 3B, which follows FIG. 3A, illustrates a trigger synchronization phase of the improved method, whereby a source trigger signal generated or received by a source node is synchronized to the master clocking signal by measuring an offset between the source trigger signal and a predetermined byte of a data frame, which is generated by a master node of the network and received by the source node. The offset value measured by the source node in the trigger synchronization phase is then transmitted across the network to each of the destination nodes. Finally, FIG. 4 illustrates an event synchronization phase of the improved method, whereby upon detecting the offset value within the predetermined byte of a received data frame, a local trigger signal is generated at one or more of the network nodes for synchronizing an event at the network node(s) to the local trigger signal. As described in more detail below, the improved method enables the local trigger signals to be generated simultaneously at each of the network nodes by compensating for the unique phase delays (e.g., the RX-TX delays) attributed to the individual nodes. Further details regarding the delay estimation phase, the trigger synchronization phase and the event synchronization phase will be discussed below.

As shown in FIG. 3A, the delay estimation phase of the improved method may typically begin upon detecting a network lock condition (in step 30). As used herein, a network lock condition may occur in a synchronous network after a power-up or reset of the network as a whole, or after a power-up or reset of a network interface controller (NIC) coupled to the network. In some cases, a network lock condition may additionally or alternatively occur following a network unlock condition, which may occur for a number of reasons. For example, when one of the network nodes powers down or resets, it will propagate an unlock condition downstream. When this occurs, network lock must be reestablished in the network nodes.

Once network lock is reestablished, the local clocks within the slave nodes will once again be locked to the frequency of the master clock signal generated by the master node. However, the data received by the destination nodes will be phase shifted with respect to the data transmitted by the source node. To compensate for such phase shifts, each node may compute the RX-TX delay attributed to that node (in step 32) each time network lock is attained. Once the network is locked, the RX-TX delay through each node will remain constant except for a relatively small variation due to network jitter.

The RX-TX delay computed by each node is a unique phase delay attributed to that node, and consists of an amount of phase delay needed for a data frame to travel between a receive (RX) pin of the node to a transmit (TX) pin of the same node. In general, the RX-TX delay may be computed between any fixed point of a data frame received at the RX pin of the node to the same fixed point of a data frame transmitted at the TX pin of the same node. The fixed point may be substantially any fixed point within the data frame, such as the Start of Frame ("SOF"), or the start or end of any particular byte within the data frame. In some embodiments, a predetermined amount may be added to the RX-TX delay to represent the delay in the transmission medium between the TX pin of one node to the RX pin of the next downstream node. This predetermined amount of delay is usually fixed for each transmission line connecting two adjacent nodes. The predetermined amount of delay is added to the measured RX-TX delay, resulting in a total delay from the TX pin of the previous node to the TX pin of the current node.

Once the RX-TX delay is computed for each node, the information may be distributed in one of two ways. In one embodiment, the RX-TX delay calculated at each of the nodes may be distributed to all other nodes on the network (in step 34). For example, a data channel may be used to transmit each individually computed RX-TX delay to all downstream and upstream nodes. This enables each node to calculate an accumulated RX-TX delay (Dacc) for that node (in step 36) by combining the individual RX-TX delays attributed to all nodes arranged between the source node and the current node.

As set forth below, the source node is the node which either receives or generates a source trigger signal (e.g., node 0 in FIG. 2). The source node may be the master node or one of the slave nodes, and is typically designated by some higher level software. The accumulated RX-TX delay for the Nth node downstream from the source trigger node will be designated RX-TX delay_N. Starting from the first node (e.g., node 1 in FIG. 2) downstream from the source node (e.g., node 0 in FIG. 2), the accumulated RX-TX delay will increase for each downstream node on the network. Once the accumulated RX-TX delay is computed for a particular node, the accumulated RX-TX delay attributed to that node will be stored therein (in step 38 of FIG. 3A) for future use.

Instead of distributing the individual RX-TX delays of each node to all other network nodes, each node (starting from the first node) may communicate its accumulated RX-TX delay to the next downstream node on the network (in alternative step 37 of FIG. 3A). Each node may compute its own accumulated RX-TX delay by combining the accumulated RX-TX delay received from an upstream node with its own unique RX-TX delay. For example, node 1 (FIG. 2) may compute and communicate its RX-TX delay to node 2. Upon receiving this delay, node 2 may compute an accumulated RX-TX delay by combining the RX-TX delay received from node 1 (i.e., node 1's accumulated RX-TX delay) with its own unique RX-TX delay. The accumulated RX-TX delay from node 2 may then be communicated to node 3, and so on. At each node, the accumulated RX-TX delay attributed to that node will be stored therein (in step 38) for future use.

Once an accumulated RX-TX delay has been stored within each node, the method may enter the trigger synchronization phase as shown, e.g., in FIG. 3B. In the illustrated embodiment, the trigger synchronization phase begins when a source trigger signal is either generated or received by the source node (in step 40). Next, the source node measures the time difference between the source trigger signal and the next occurrence of a predetermined byte of a data frame transmitted by the source node (in step 42). This time difference is referred to herein as the "offset value" and is denoted by Dts.

In one preferred embodiment, the predetermined byte may be a designated "trigger byte" of a MOST data frame. For example, if the communication system 10 shown in FIG. 1 is implemented within a MOST network, one byte of a MOST data frame may be designated as a "trigger byte." In some cases, the trigger byte can be a designated byte on the MOST frame, which is enabled only during the trigger synchronization phase of the method described herein. At other times, the trigger byte can be used for its regular functional purpose. In one example, frame byte 10 of the MOST150 frame may be designated as a trigger byte, since it is currently designated as a spare byte in the MOST NIC 20 firmware. However, the trigger byte is not limited to the $10^{th}$ byte of the MOST150 frame and may occupy substantially any predetermined byte of a data frame, regardless of whether or not that data frame is transmitted within a MOST network or other synchronized network.

In one embodiment, the Dts offset value may be measured between the source trigger signal and the start of the next MOST trigger byte transmitted by the source node. If the source trigger signal is received before the MOST trigger byte, the source node may transmit the Dts offset value to the next downstream node (in step 46) within the same MOST trigger byte. However, if the source trigger signal is received after the MOST trigger byte, the Dts value may be transmitted to the next downstream node (in step 46) within a MOST trigger byte of the next data frame, which would increase latency by delaying the transmission of the Dts value by a small amount. In alternative embodiments, the Dts offset value could be measured between the source trigger signal and the end of a MOST trigger byte, or some other predetermined byte of a data frame. However, this would further increase latency by always requiring the Dts value to be transmitted within a following trigger byte.

For purposes of this disclosure, the Dts offset value described herein may be considered a "valid data value." In general, valid data values contain data and are distinguishable from non-data values, which may be transmitted within a data frame as identifiers, coding violations, etc. In one embodiment, the Dts offset value may be transmitted to the downstream nodes only after a "valid trigger signal" has been previously transmitted to the nodes. This valid trigger signal may be transmitted within the MOST trigger byte of a data frame, and may contain any information which indicates to the downstream nodes that a valid trigger signal is present within the data frame. The valid trigger signal may include any valid data byte, such as a non-zero value, for example. After the valid trigger signal is transmitted, the Dts offset value may be transmitted to the downstream nodes within the next MOST trigger byte.

In a preferred embodiment, network bandwidth is efficiently utilized by using the Dts offset value (i.e., a valid data value) transmitted within the MOST trigger byte to not only convey the Dts offset value to the downstream nodes, but also to indicate to the downstream nodes that a valid trigger is present within a data frame. For example, a non-valid data value (such as a coding violation or a string of all 0's) may be transmitted within the MOST trigger byte during times when there is no valid trigger signal to be transmitted in a data frame. This is illustrated in the data stream 60 shown, e.g., in FIG. 5. Once a valid trigger signal is generated or received by the source node, a valid data value corresponding to the Dts offset value may be transmitted within the next MOST trigger byte as shown, e.g., in data streams 62 and 64 of FIG. 5. The fact that the MOST trigger byte contains a valid data value, as opposed to a non-valid data value, indicates to the downstream nodes that a trigger signal is present within the data frame. This effectively reduces network bandwidth by not requiring the Dts offset value and the indication of a valid trigger to be transmitted separately. After going around the MOST network, the trigger byte is stopped from passing through the source node and repeating again. If a new trigger signal is generated or received at the source node, the new trigger signal will be immediately sent out on the next data frame.

Figure 5:
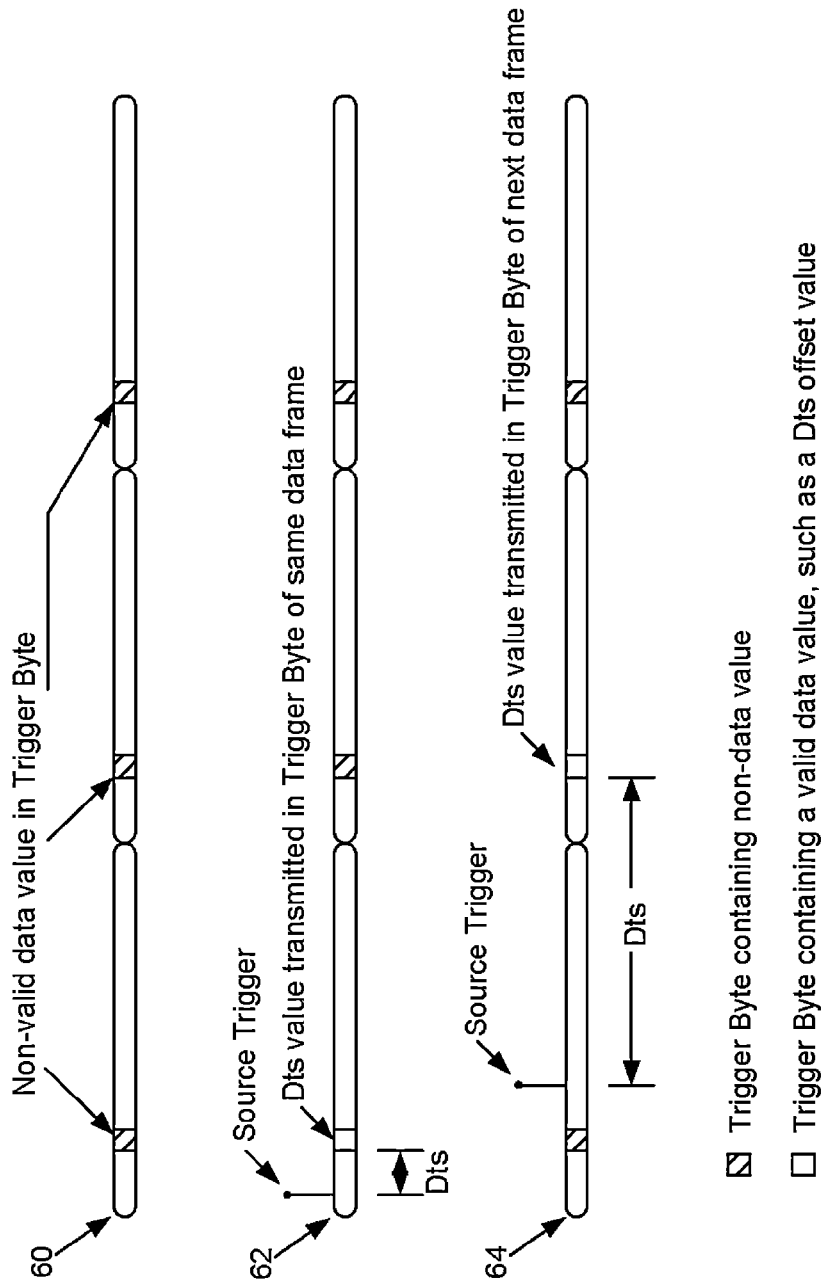
FIG. 5 is a timing diagram illustrating a series of data streams containing: (a) only non-valid data within the predetermined byte of each data frame when no source trigger signal is received, (b) valid data (e.g., a Dts offset value) within the predetermined byte of a data frame when a source trigger signal is received before the predetermined byte of the same data frame, and (c) valid data (e.g., a Dts offset value) within the predetermined byte of a data frame when a source trigger signal is received after the predetermined byte of a preceding data frame.

As noted above, the Dts offset value is preferably measured between the source trigger signal and the start of the next MOST trigger byte received by the source node, so that the Dts offset value may be transmitted to a downstream node within the next MOST trigger byte. As shown in FIG. 5, however, measurement of the Dts offset value generally depends on the arrival of the source trigger signal. If the source trigger signal arrives at the source node before the MOST trigger byte of a data frame, as shown in data stream 62 of FIG. 5, the Dts offset value is measured between the source trigger signal and the MOST trigger byte of the same data frame. On the other hand, if the source trigger signal arrives at the source node after the MOST trigger byte of a data frame, as shown in data stream 64 of FIG. 5, the Dts offset value is measured between the source trigger signal and the MOST trigger byte of the next data frame. In the case that the source trigger signal arrives during the MOST trigger byte (not shown), the Dts offset value is measured between the source trigger signal and the MOST trigger byte of the next data frame.

Returning to FIG. 4, the data frames generated by the source node are transmitted onto the network and received by the destination nodes (in step 48). The event synchronization phase of the improved method begins (in step 50) when a destination node detects a Dts offset value (i.e., a valid data value) within a MOST trigger byte of a received data frame. When this occurs, the destination node may initiate a countdown timer, which counts down from a predetermined value (in step 52). In one embodiment, the predetermined value may be twice the frame size (i.e., twice the number of bits) of a MOST data frame. For example, the predetermined value may be 2*(1024)=2048 in a MOST50 system, or 2*(3072)=6144 in a MOST150 system. It is noted, however, that the predetermined value may be substantially any other value deemed appropriate. The count value is monitored by the destination node (in step 54) and a local trigger signal is generated at the destination node (in step 56) once the count value equals the predetermined value minus a combined delay of the Dts offset value and the accumulated RX-TX delay stored within that destination node. Once generated, the trigger signal generated locally at the destination node may be used to synchronize a multimedia device coupled to the destination node, or more specifically, an event occurring within the multimedia device, to the locally generated trigger signal (in step 58).

The improved method shown in FIGS. 3-4 provides event synchronization at multiple network nodes by synchronizing the source trigger signal to the master clock signal (via the Dts offset value) and recreating a local trigger signal simultaneously at one or more destination nodes. The trigger signals are generated simultaneously at each of the destination nodes by compensating for the unique RX-TX delays attributed to each node between the source node and the destination node. More precisely, the method described herein enables the destination nodes to generate local trigger signals at substantially the same time within a small time window of uncertainty. This time window determines the accuracy of the generated trigger signals and is a direct result of two factors—the first is the small uncertainty of the RX-TX delay measurement at each of the nodes between the source node and the destination node due to different clock domains at the RX point and TX point of these nodes, and the second is due to jitter on the network.

Network jitter accounts for a majority of the uncertainty in the trigger signal timing. This type of jitter is a low frequency jitter, which can be tracked by a PLL included within each network node. This means that at any given point in time, the instantaneous jitter at different nodes on the network will be substantially the same value. Thus, a majority of the uncertainty in the trigger signal timing may be removed by compensating for network jitter. Once network jitter is removed, the remaining uncertainty will only be due to the accuracy of the RX-TX delay measurement. Since the uncertainty of the RX-TX delay measurement is very small (e.g., about 6.5 ns per node in the MOST150 system), it may be negligible in most cases.

Returning to FIG. 3B, an alternative embodiment of the method described herein compensates for network jitter by measuring the RX-TX delay at the source node each time a trigger signal is generated or received by the source node. This could mean that the RX-TX delay is measured for each data frame received by the source node, but used only when the source trigger signal arrives, or the RX-TX delay is measured and used only when the source trigger signal arrives. An estimation of the amount of jitter at the source node is calculated by determining the difference between the RX-TX delay calculated during the delay estimation phase (the phase shown in FIG. 3A immediately following a network lock condition) and the currently measured RX-TX delay. After computing the jitter value, the source node may add the jitter value to the Dts offset value (in optional step 44 of FIG. 3B) before transmitting the combined Dts offset and jitter values across the network in the MOST trigger byte (in step 46). In some cases (not shown), jitter values may be computed in the same way at the downstream nodes and the jitter value may be adjusted before forwarding the updated Dts+jitter values to the next downstream node in the MOST trigger byte.

Figure 6:
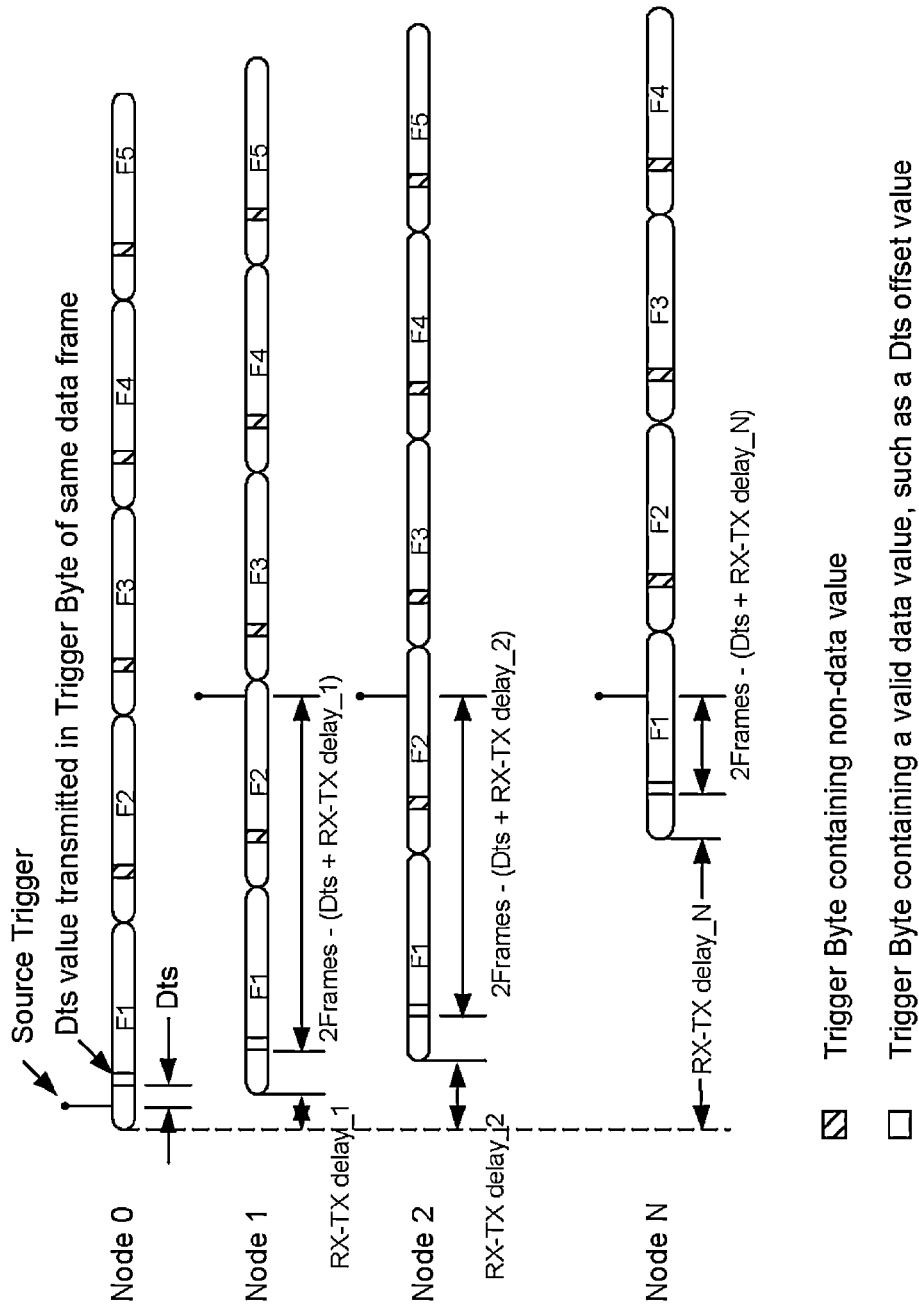
FIGS. 6 and 7 are timing diagrams providing two different examples of how a local trigger signal may be generated simultaneously at a plurality of network nodes utilizing the methods shown in FIGS. 3A, 3B and 4.
Figure 7:
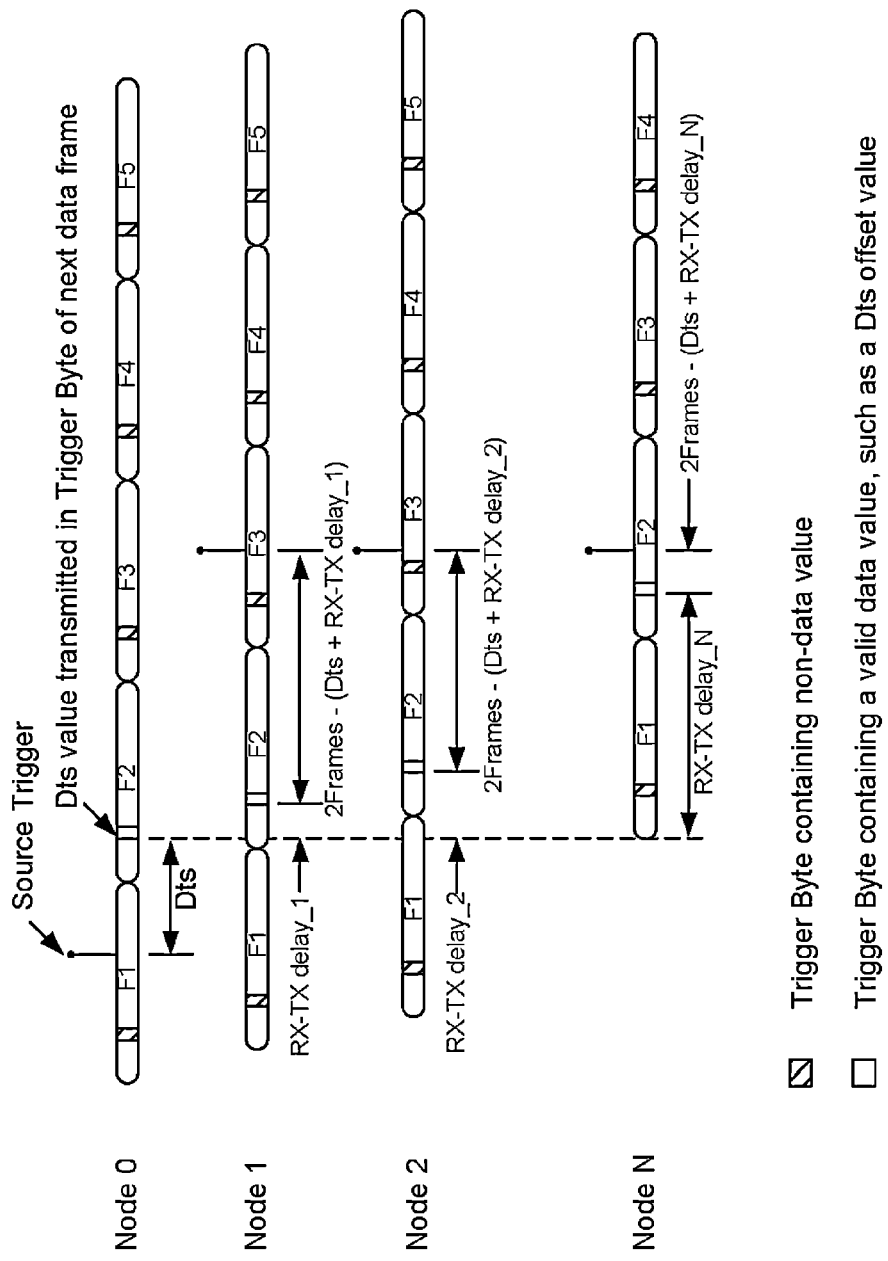

FIGS. 6 and 7 provide two different examples of how a local trigger signal may be generated simultaneously at a plurality of destination nodes utilizing the method described herein. In particular, FIGS. 6 and 7 are timing diagrams illustrating the arrival of a source trigger signal at source node 0 and the simultaneous generation of local trigger signals at each of the destination nodes 1 to N. Although nodes 1 to N may comprise all destination nodes in some embodiments of the invention, it is noted that local trigger signals may be generated at only a select subset of the destination nodes in other embodiments of the invention.

In the exemplary timing diagram of FIG. 6, the source trigger signal arrives at the source node 0 a short time before the MOST trigger byte arrives in the F1 data frame. The source node 0 measures the time delay (i.e., the Dts offset) between the source trigger signal and the start of the MOST trigger byte in the F1 frame, and transmits the Dts offset value across the network in the MOST trigger byte of the same F1 frame. As soon as the Dts offset value is detected at each destination node 1 to N, the destination node will initiate the countdown timer and generate a local trigger signal once the count value of the timer is equal to 2*Frame size (or some other predetermined value) minus the combined delay of the Dts offset value and the accumulated RX-TX delay stored within that destination node.

The accumulated RX-TX delay for each node downstream from the source trigger node is designated RX-TX delay_1, RX-TX delay_2 . . . RX-TX delay_N in FIGS. 6 and 7. As noted above, the RX-TX delay is computed between a fixed point of a data frame received at the RX pin of a node to the same fixed point of a data frame transmitted at the TX pin of the same node. Once the RX-TX delay is computed at a particular node (e.g., node 2), the accumulated RX-TX delay may be computed for that node (e.g., RX-TX delay_2) by combining the unique RX-TX delays attributed to all network nodes arranged between the source node 0 and that node. In some embodiments, a predetermined amount of delay may be added to the RX-TX delay while calculating the accumulated delay. This predetermined amount represents the amount of delay in the physical transmission medium from the TX pin of the previous node to the RX pin of the current node.

FIG. 6 illustrates the accumulated RX-TX delay stored within each destination node. In particular, FIG. 6 illustrates how, in one embodiment, the accumulated RX-TX delay for a particular node (e.g., RX-TX delay_2 for node 2) may be computed between the Start of Frame ("SOF") of the F1 data frame at the source node 0 and the SOF of the F1 data frame at the particular destination node. It is noted, however, that the RX-TX delays and the accumulated RX-TX delays may be computed somewhat differently, in other embodiments of the invention.

FIG. 7 is another exemplary timing diagram illustrating how a local trigger signal may be generated simultaneously at a plurality of destination nodes utilizing the method described herein. However, the timing diagram shown in FIG. 7 differs from that shown in FIG. 6 in many ways: (1) the arrival of the source trigger signal at the source node, (2) the measurement of the Dts offset value at the source node and subsequent transmission of the Dts offset value across the network, and (3) the manner in which the RX-TX delay values are computed at each of the destination nodes. Each of these differences will be discussed in detail below.

Unlike the timing diagram shown in FIG. 6, the source trigger signal shown in the timing diagram of FIG. 7 arrives at the source node 0 some time after the MOST trigger byte arrives at the source node 0 in the F1 data frame. This causes the source node 0 to measure the time delay (i.e., the Dts offset) between the source trigger signal and the start of the MOST trigger byte in the next data frame (i.e., in the F2 data frame), and to transmit the Dts offset value across the network in the MOST trigger byte of the F2 data frame.

In addition to the differences described above, the timing diagram shown in FIG. 7 utilizes a different marker or fixed point to calculate the accumulated RX-TX delays associated with each of the destination nodes. In FIG. 6, the accumulated RX-TX delays were computed between the Start of Frame ("SOF") of the F1 data frame at the source node 0 and the SOF of the F1 data frame at each of the destination nodes 1 to N. In FIG. 7, the accumulated RX-TX delays are calculated between the start of a MOST trigger byte in a particular data frame received by the source node 0 (such as data frame F2) and the start of a MOST trigger byte in the same data frame received by the destination nodes 1 to N. Although FIG. 7 may insinuate that only MOST trigger bytes containing valid data values (i.e., the MOST trigger bytes containing Dts values in the F2 data frames) are used to compute the accumulated RX-TX delays, one skilled in the art would understand how MOST trigger bytes containing non-valid data values (such as the MOST trigger bytes in the F1 data frames) may be alternatively used to calculate the accumulated RX-TX delays.

Preferred embodiments of a method have now been described in reference to FIGS. 2-7 for synchronizing a plurality of network nodes after a network lock condition occurs within a synchronous network. In general, the method generates a local trigger signal at one or more network nodes at substantially the same time by eliminating timing differences caused by unpredictable phase delays at each of the network nodes. The local trigger signals can be used to synchronize devices coupled to different nodes of the network, or more specifically, to synchronize events occurring within the devices coupled to different network nodes. The method described herein is generally applicable when the trigger signal that needs to be generated is not of a frequency higher than the frame transfer rate. In addition, the trigger signal can be asynchronous to the frame transfer rate and does not need to be periodic.

Figure 8:
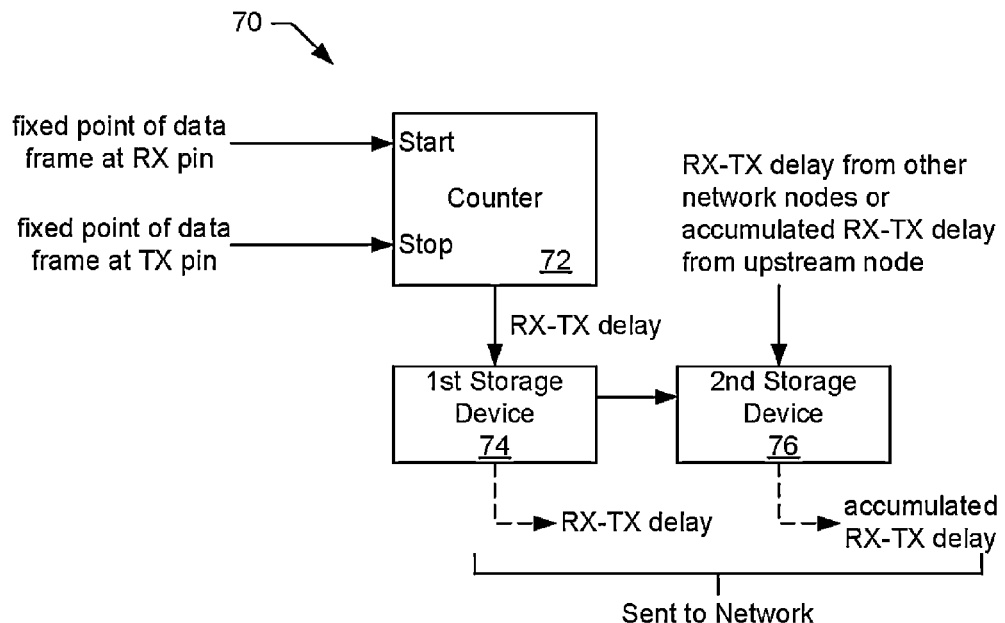
FIG. 8 is a block diagram illustrating exemplary hardware components that may be included within all network nodes for determining a unique phase delay attributed to a particular network node.
Figure 9:
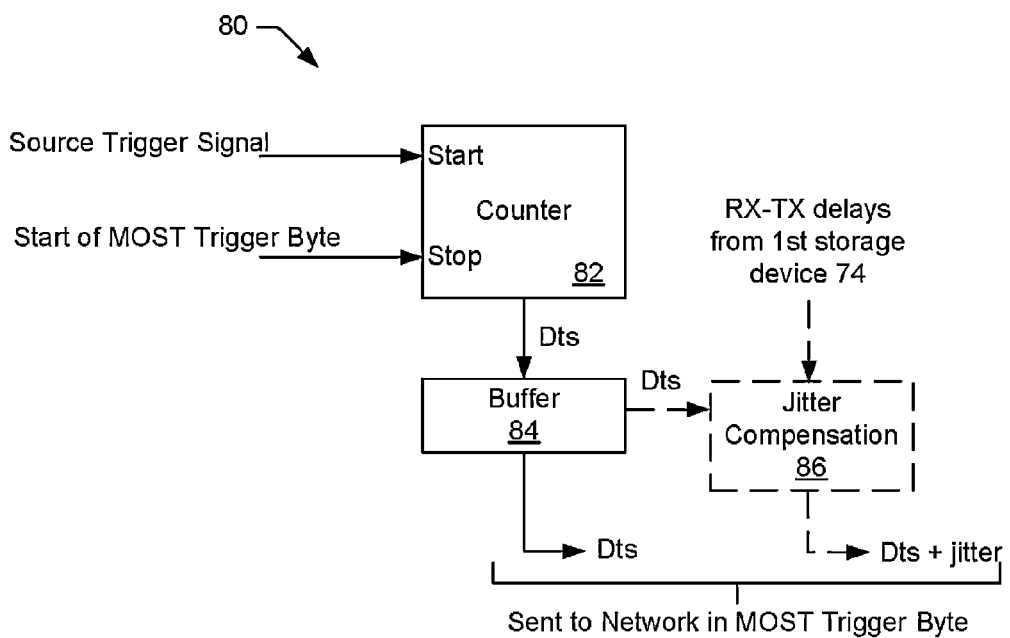
FIG. 9 is a block diagram illustrating exemplary hardware components that may be included within the source node for measuring an offset value between a source trigger signal and a predetermined byte of a data frame received by the source node, and optionally, for compensating for network jitter.
Figure 10:
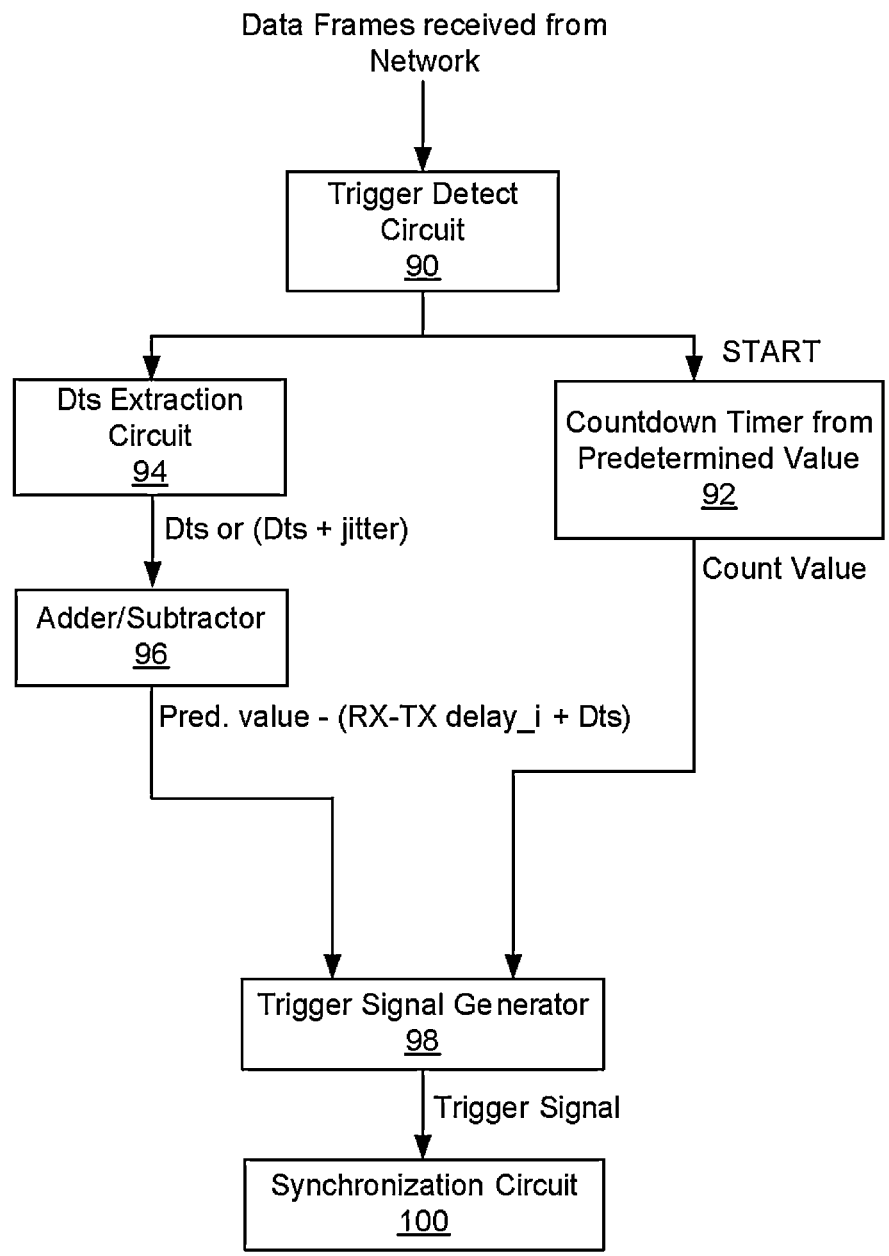
FIG. 10 is a block diagram illustrating exemplary hardware components that may be included within all network nodes (other than the source node) for detecting an offset value within a predetermined byte of a received data frame, generating a local trigger signal and synchronizing an event or a device coupled to the network node to the generated trigger signal.

In some embodiments, the method described herein may be implemented in hardware, software or any combination of hardware and software (i.e., firmware). In a preferred embodiment, however, the method may be implemented primarily in hardware to provide minimum delay. FIGS. 8-10 illustrate exemplary hardware components that may be used to implement the method described herein. It is noted, however, that other hardware and/or software components having substantially the same functionality may be used in place of the exemplary components shown in FIGS. 8-10 without departing from the scope of the invention.

FIG. 8 illustrates exemplary hardware components that may be included within all network nodes to calculate the unique phase delays attributed to the individual network nodes. In particular, FIG. 8 illustrates one embodiment of a delay computation circuit 70 that may be included within each of the network nodes for determining a unique phase delay attributed to a particular network node after a network lock condition occurs. As noted above, the unique phase delay (referred to herein as an RX-TX delay) consists of an amount of phase delay needed for a fixed point of a data frame to travel between a receive (RX) pin of a particular network node to a transmit (RX) pin of the same network node.

In the embodiment of FIG. 8, the delay computation circuit 70 comprises a counter 72, which is started upon receiving the fixed point of the data frame at the RX pin of the node and stopped upon receiving the fixed point of the same data frame at the TX pin of the node. Once the counter 72 is stopped, the count value contained within the counter 72 (which represents an estimation of the RX-TX delay through that node) is transferred to a first storage device (such as a buffer or register) 74 before it is forwarded to a second storage device 76.

The second storage device 76 stores the accumulated phase delay associated with that node. As noted above, the accumulated phase delay may be calculated in one of two ways. In one embodiment, the RX-TX delay from buffer 74 may be transmitted across the network to all other nodes of the network. Each node may then calculate its own accumulated delay by adding the RX-TX delay stored within its own buffer 74 with the RX-TX delays transmitted across the network from all nodes arranged between the source node and itself. In another embodiment, each node (starting from the first node after the source node) may compute an accumulated phase delay for that node by combining the accumulated phase delay received from an upstream node with its own RX-TX delay stored within buffer 74. After storing the accumulated phase delay within the second storage device 76, the node may transmit its accumulated RX-TX delay across the network to the next downstream node.

FIG. 9 illustrates exemplary hardware components that may be included within the source node to measure a Dts offset value. In particular, FIG. 9 illustrates one embodiment of an offset computation circuit 80 that may be included within a source node for measuring an offset value between a source trigger signal received by the source node and a predetermined byte (e.g., a MOST trigger byte) of a data frame generated by a master node of the network and received by the source node.

In the embodiment of FIG. 9, the offset computation circuit 80 comprises a counter 82, which is started upon receiving the source trigger signal and stopped upon receiving the start of the next MOST trigger byte (or some other predetermined byte) of a data frame. Once the counter 82 is stopped, the count value contained within the counter 82 (which represents the time delay or offset between the source trigger signal and a data byte transmitted at the frame transfer rate of the network) is transferred to a buffer (or register) 84 before it is forwarded onto the network in the MOST trigger byte.

In some embodiments, the offset computation circuit 80 may include a jitter compensation circuit 86 for measuring and compensating for network jitter. To compensate for network jitter, the jitter compensation circuit 86 may be configured for receiving multiple unique phase delays from the first storage device 74 included within the source node. In particular, the jitter compensation circuit 86 may be configured for receiving an RX-TX delay, which was previously computed by the source node following a network lock condition, and another RX-TX delay computed by the source node upon receiving/generating a source trigger signal. In order to calculate a jitter value, the jitter compensation circuit 86 may include an adder or subtractor for determining a difference between the previously and currently measured RX-TX delays. Once computed, the jitter value may be added to the offset value before transmitting the combined offset and jitter values across the network within the MOST trigger byte.

FIG. 10 illustrates exemplary hardware components that may be included within the network nodes to detect an offset value within a predetermined byte of a received data frame, generate a local trigger signal and synchronize a device and/or event to the local trigger signal. As shown in FIG. 10, a trigger detect circuit 90 may be included within each of the network nodes for receiving data frames from the network and detecting an offset value (i.e., a Dts offset value) within a predetermined byte of one of the received data frames. In one example, the trigger detect circuit 90 may comprise logic gates, which have been designed to determine whether or not the predetermined byte (e.g., the MOST trigger byte) contains non-valid data (e.g., all 0's, an identifier or a coding violation) or valid data (e.g., a Dts offset value or a combined Dts offset and jitter value). If the trigger detect circuit 90 determines that the predetermined byte of a data frame contains only non-valid data, the circuit may simply continue to receive data frames and monitor the predetermined byte contained within those frames.

If the trigger detect circuit 90 determines that the predetermined byte of a data frame contains valid data, the trigger detect circuit 90 may supply a start signal to a countdown timer 92 for counting down from a predetermined value. At the same time, the trigger detect circuit 90 may enable a Dts extraction circuit 94 to copy the Dts offset value (i.e., the valid data) from the predetermined byte into a register. The Dts offset value may then be supplied to an adder and/or subtractor 96 for computing the common time marker to be used for generating the local trigger signal at each of the network nodes. As noted above and shown in FIG. 10, the common time marker may be computed by adding the Dts offset value to the accumulated phase delay stored within each node to produce a combined delay, and subtracting the combined delay from the predetermined value. The results from the adder/subtractor 96 are supplied along with the count value from countdown timer 92 to a trigger signal generator circuit 98.

Trigger signal generator circuit 98 generates a local trigger signal once the count value of countdown timer 92 is equivalent to the computation results supplied from adder/subtractor 96. In one embodiment, the trigger signal generator circuit 98 may include a digital comparator for comparing the count value to the computation results and generating a logic value in response thereto, and a selection device (such as a flip-flop or multiplexer) for generating a local trigger signal in response to the logic value. For example, the comparator may generate a logic high value to indicate that the count value is equivalent to the computation results. Upon receiving the logic high value from the comparator, the selection device may generate a local trigger signal at the network node. Because the method described herein compensates for the unique phase delays attributed to each network node, the local trigger signals are generated simultaneously at each of the network nodes.

Once a local trigger signal is generated at a particular node, the trigger signal may be supplied to an event synchronization circuit 100 for synchronizing a device coupled to the particular network node, or an event occurring within the device, to the generated trigger signal. In one embodiment, the device may comprise one or more multimedia devices, such as but not limited to, speakers, microphones, cameras, display screens, etc. In one embodiment, the events may include, but are certainly not limited to, clock signal generation, input/output signal generation and data sampling. In one embodiment, the synchronization circuit may include logic for synchronizing the device coupled to the particular network node, or an event occurring within the device, upon receiving the generated trigger signal.

In some embodiments, one or more of the hardware components shown in FIGS. 8-10 may be embodied on a single monolithic substrate. For example, the delay computation circuit, the trigger detect circuit, the countdown timer, and the trigger signal generator circuit may be included within a network interface controller (such as NIC 20, FIG. 1), which is embodied on a single monolithic substrate. It is noted, however, that the hardware components shown in FIGS. 8-10 are not restricted to a single monolithic substrate or a network interface controller in all embodiments of the invention. In some embodiments, the synchronization circuit may also be embodied on the single monolithic substrate comprising the NIC. In other embodiments, the synchronization circuit may be embodied on a separate monolithic substrate included within each multimedia device.

It will be appreciated to those skilled in the art having the benefit of this disclosure that this invention is believed to provide an improved communication system and method for synchronizing a plurality of network nodes after a network lock condition occurs within a network. More specifically, the invention provides means for generating a local trigger signal at each of the plurality of network nodes for synchronizing devices coupled to the network nodes (or events occurring within the devices) to the trigger signal. Using the means provided herein, the local trigger signals are generated simultaneously at each of the plurality of network nodes by compensating for unique phase delays attributed to each of the plurality of network nodes. This provides a significant improvement over previous synchronization methods, which generated fixed but unpredictable amounts of phase delays at each of the network nodes. Further modifications and alternative embodiments of various aspects of the invention will be apparent to those skilled in the art in view of this description. It is intended, therefore, that the following claims be interpreted to embrace all such modifications and changes and, accordingly, the specification and drawings are to be regarded in an illustrative rather than a restrictive sense.

What is claimed is:

1. A method for synchronizing a plurality of network nodes after a network lock condition occurs within a network, the method comprising:
    calculating a unique phase delay at each of the plurality of network nodes after the network lack condition occurs, wherein each unique phase delay consists of an amount of phase delay needed for a data frame to travel between a receive pin of a network node to a transmit pin of the same network node; and
    generating a local trigger signal simultaneously at each of the plurality of network nodes by compensating for the unique phase delays calculated at each of the plurality of network nodes, and wherein the local trigger signals are used to synchronize events occurring at each of the plurality of network nodes.

2. The method as recited in claim 1, further comprising:
    storing an accumulated phase delay within each of the plurality of network nodes, wherein the accumulated phase delay stored within each of the plurality of network nodes is computed by combining the unique phase delays attributed to the network nodes arranged between a source node of the network and each respective network node.

3. The method as recited in claim 2, wherein after the step of calculating the unique phase delays and before the step of storing an accumulated phase delay, the method further comprises:
    transmitting the unique phase delays calculated at each of the plurality of network nodes to all network nodes; and
    calculating the accumulated phase delay at each of the plurality of network nodes by combining the unique phase delays attributed to the network nodes arranged between the source node and each respective network node.

4. The method as recited in claim 2, wherein after the step of calculating the unique phase delays and before the step of storing an accumulated phase delay, the method further comprises transmitting the accumulated phase delay computed at each network node to a next downstream network node.

5. The method as recited in claim 2, further comprising:
    measuring an offset value between a source trigger signal received by or generated within the source node and a predetermined byte of a data frame generated by a master node of the network; and
    transmitting the offset value across the network to each of the plurality of network nodes.

6. The method as recited in claim 5, wherein after the step of measuring and before the step of transmitting, the method further comprises adding a jitter value calculated at the source node to the offset value and transmitting the combined jitter and offset values across the network to each of the plurality of network nodes.

7. The method as recited in claim 5, wherein the offset value is transmitted within the predetermined byte of the data frame to each of the plurality of network nodes.

8. The method as recited in claim 7, further comprising:
    receiving data frames transmitted by the master node at each of the plurality of network nodes;
    wherein if a particular network node detects the offset value within the predetermined byte of one of the received data frames, the method as performed by the particular network node further comprises:
        initiating a countdown timer from a predetermined value;
        generating a local trigger signal once a count value of the countdown timer is equivalent to the predetermined value minus a combined delay of the offset value and the accumulated phase delay stored within the particular network node; and
        synchronizing an event at the particular network node to the local trigger signal.

9. The method as recited in claim 8, wherein prior to the step of transmitting the offset value the method comprises transmitting an indication of a valid trigger across the network to each of the plurality of network nodes, and wherein prior to the step of detecting the offset value the method comprises detecting the indication of the valid trigger.

10. The method as recited in claim 1, wherein the method enables the events occurring at each of the plurality of network nodes to be synchronized to a common time marker.

11. The method as recited in claim 10, wherein the events comprise generation of clock signals at each of the plurality of network nodes.

12. The method as recited in claim 10, wherein the events comprise data sampling at each of the plurality of network nodes.

13. The method as recited in claim 10, wherein the events comprise generation of input/output (I/O) signals at each of the plurality of network nodes.

14. The method as recited in claim 13, wherein the I/O signals are used to synchronize display screens coupled to each of the plurality of network nodes.

15. The method as recited in claim 13, wherein the I/O signals are used to synchronize image capture by cameras coupled to each of the plurality of network nodes.

16. The method as recited in claim 13, wherein the I/O signals are used to synchronize audio signals supplied to speakers coupled to each of the plurality of network nodes.

* * * * *